US007154728B2

(12) United States Patent
Schmidt et al.

(10) Patent No.: US 7,154,728 B2
(45) Date of Patent: Dec. 26, 2006

(54) ACTIVE PART FOR A SURGE ARRESTER

(75) Inventors: Walter Schmidt, Bellikon (CH); Robert Hauser, Berikon (CH)

(73) Assignee: ABB Technology AG, Zurich (CH)

(*) Notice: Subject to any disclaimer, the term of this patent is extended or adjusted under 35 U.S.C. 154(b) by 345 days.

(21) Appl. No.: 10/776,271

(22) Filed: Feb. 12, 2004

(65) Prior Publication Data

US 2005/0105238 A1 May 19, 2005

(30) Foreign Application Priority Data

Feb. 12, 2003 (EP) ................................ 03405081

(51) Int. Cl.
*H02H 1/00* (2006.01)

(52) U.S. Cl. ........................ 361/127; 361/117; 361/118

(58) Field of Classification Search ................ 361/127, 361/117–118; 338/20–21, 101–106; 174/4
See application file for complete search history.

(56) References Cited

U.S. PATENT DOCUMENTS

| | | | |
|---|---|---|---|
| 5,517,382 A * | 5/1996 | Leupp et al. | 361/118 |
| 5,936,826 A | 8/1999 | Schmidt | |
| 5,942,968 A * | 8/1999 | Schmidt | 338/21 |
| 6,594,133 B1 * | 7/2003 | Schmidt et al. | 361/117 |

FOREIGN PATENT DOCUMENTS

| | | |
|---|---|---|
| EP | 0614198 B1 | 1/1997 |
| EP | 1066640 B1 | 5/2002 |
| JP | 63313806 | 12/1988 |
| JP | 63313806 A * | 12/1988 |
| JP | 2002353009 | 12/2002 |

* cited by examiner

*Primary Examiner*—Stephen W. Jackson
*Assistant Examiner*—Terrence Willoughby
(74) *Attorney, Agent, or Firm*—Buchanan Ingersoll & Rooney PC

(57) ABSTRACT

The active part which is provided for use in a surge arrester includes two connecting fittings, which are arranged along an axis at a distance from one another, at least one cylindrical varistor column, which is provided between the two connecting fittings, and at least one dielectric loop. This loop is supported on the two connecting fittings and thus holds the active part together, thus forming a contact force. The active part is distinguished by a small physical height and little use of materials. This is achieved in that at least one of the two connecting fittings has an electrode, which is arranged at right angles to the axis and is in the form of a plate, as well as an electrical connection, which is integrally formed on the plate. Furthermore, supporting means which are in the form of shoulders are provided for the dielectric loop, and are formed in the plate and/or are integrally formed at the edge of the plate.

9 Claims, 3 Drawing Sheets

ACTIVE PART FOR A SURGE ARRESTER

TECHNICAL FIELD

The invention is based on an active part for a surge arrester as claimed in the precharacterizing clause of patent claim 1. The invention also relates to a surge arrester which includes this active part.

The active part has two connecting fittings which are arranged along an axis at a distance from one another and to which a voltage in the voltage range above 1 kV can be applied. A varistor column, which is formed from a varistor element or from two or more series-connected varistor elements, is located between the two connecting fittings; The active part also has a dielectric loop or, possibly, two or more dielectric loops. This loop or the loops is or are supported on the two connecting fittings, thus holding the connecting fittings and the varistor column together, thus forming a contact force. The loop or the loops may also be supported on one of the two connecting fittings and on a connection piece, which is arranged between the two connecting fittings in the varistor column, and may hold together a section of the varistor column, which is bounded by the supporting connecting fitting and the connection piece, thus forming a contact force.

A surge arrester is formed by protecting the active part against direct contact or dirt, for example by embedding it in a polymer or by installing it in a possibly gas-insulated housing.

PRIOR ART

In the precharacterizing clause, the invention refers to a prior art of surge arresters as is specified in EP 614,198 B1 or in U.S. Pat. No. 5,942,968. Surge arresters which are described in these patent publications each include an active part, which is in the form of a column and is encapsulated by a polymer housing, with a varistor column which is held between two connecting fittings. The holding force, but at the same time also the contact force in the active part, is applied by means of one or more prestressed dielectric loops which are supported on the two connecting fittings. The connecting fittings are each machined out of a metal cylinder and have slots and/or projections, each of which are used to hold one end of the dielectric loops. Furthermore, the connecting fittings have holes in the column direction in order to accommodate electrical connections, possibly as well as a cavity, which likewise extends in the column direction and is used to accommodate a section of the varistor column. The connecting fittings therefore extend over a comparatively long distance in the column direction, and thus increase the physical height of the active part, and hence also of the surge arrestor.

Furthermore, EP 1,066,640 B1 describes a surge arrestor having an active part which has a varistor column and in which a connection piece is arranged in the varistor column, having bearing points on which prestressed dielectric loops are supported which extend from an upper to a lower connecting fitting of the active part. These dielectric loops are also used to form a holding and contact force. The connection piece allows the active part to be dielectrically loaded to a greater extent than in the prior art mentioned above, thus resulting in a surge arrestor for a higher voltage class.

DESCRIPTION OF THE INVENTION

The invention, as it is defined in the patent claims, achieves the object of specifying an active part of the type mentioned initially, which is distinguished by a small physical height.

In the case of the active part according to the invention, at least one of the two connecting fittings has an electrode which is arranged at right angles to the axis and is in the form of a plate as well as an electrical connection which is integrally formed on the plate, and means for supporting one end of the dielectric loop, which means are formed in the plate and/or are integrally formed at the edge of the plate.

The physical height of the active part is thus on the one hand considerably reduced. On the other hand, the connecting fittings can now be manufactured using little material and with little effort, thus considerably reducing the production costs for the active part.

In order to save material, it is recommended that the electrical connection which is integrally formed on the plate be flat. An electrical connection such as this may be connected to the plate at any desired angle with respect to the plane of the plate, depending on the arrangement and configuration of the conductor that is to be connected to it. In order to allow the conductor to be connected easily, it is advantageous for the electrical connection to be in the form of a perforated plate or a plug-in contact.

In one embodiment of the active part according to the invention, in which the contact force is achieved by means of at least one cup spring, this spring may be centered while maintaining a predetermined physical height by means of an axially symmetrical centering tab which projects from a surface of the plate facing the varistor columns. This tab may be formed in the plate but may also be in the form of an insert part and may be fixed in a recess in the plate. The tab is passed through the hole in the cup spring, which is generally in the form of a conical annular disk. In order to prevent overextension of the cup spring during installation or during operation of the active part, the diameter of the centering tab and the internal diameter of the annular disk should be matched to one another so as to prevent the cup spring from being pressed flat.

In the case of the active part according to the invention, the supporting means advantageously have at least one shoulder which is integrally formed at the edge of the plate and is narrower than the diameter of the varistor column. A narrow shoulder such as this is particularly suitable for manufacturing active parts with large diameters. Two or more such narrow shoulders and a corresponding number of dielectric loops make it possible to produce a mechanically robust active part while maintaining a small physical height, which is also governed by the thickness of the plate.

If the supporting means have a shoulder which is formed in the plate and passes through the axis of the varistor column, then the mechanical strength and the desired contact force of the active part can be achieved while maintaining the small physical height and with a single dielectric loop. The mechanical strength is increased further by supporting means which have two shoulders, each of which is formed in one of two sections of the plate edge which run in a straight line. Irrespective of whether only one, two or possibly even more shoulders is or are provided in the plate, it is advantageous, in order to ensure good mechanical strength and a uniform contact pressure while maintaining the small physical height, for each shoulder to have a surface which is largely parallel to the plate surface over the majority of the plate extent, and for the associated loop to be in the form of a rectangle and to be supported on the inside by means of one of the rectangular faces on the surface.

BRIEF DESCRIPTION OF THE DRAWINGS

The invention will be explained in the following text with reference to exemplary embodiments. In the figures:

FIG. 7 shows a view of a third embodiment of the active part according to the invention, which is designed such that it can be plugged in.

APPROACHES TO IMPLEMENTATION OF THE INVENTION

Figure 1:
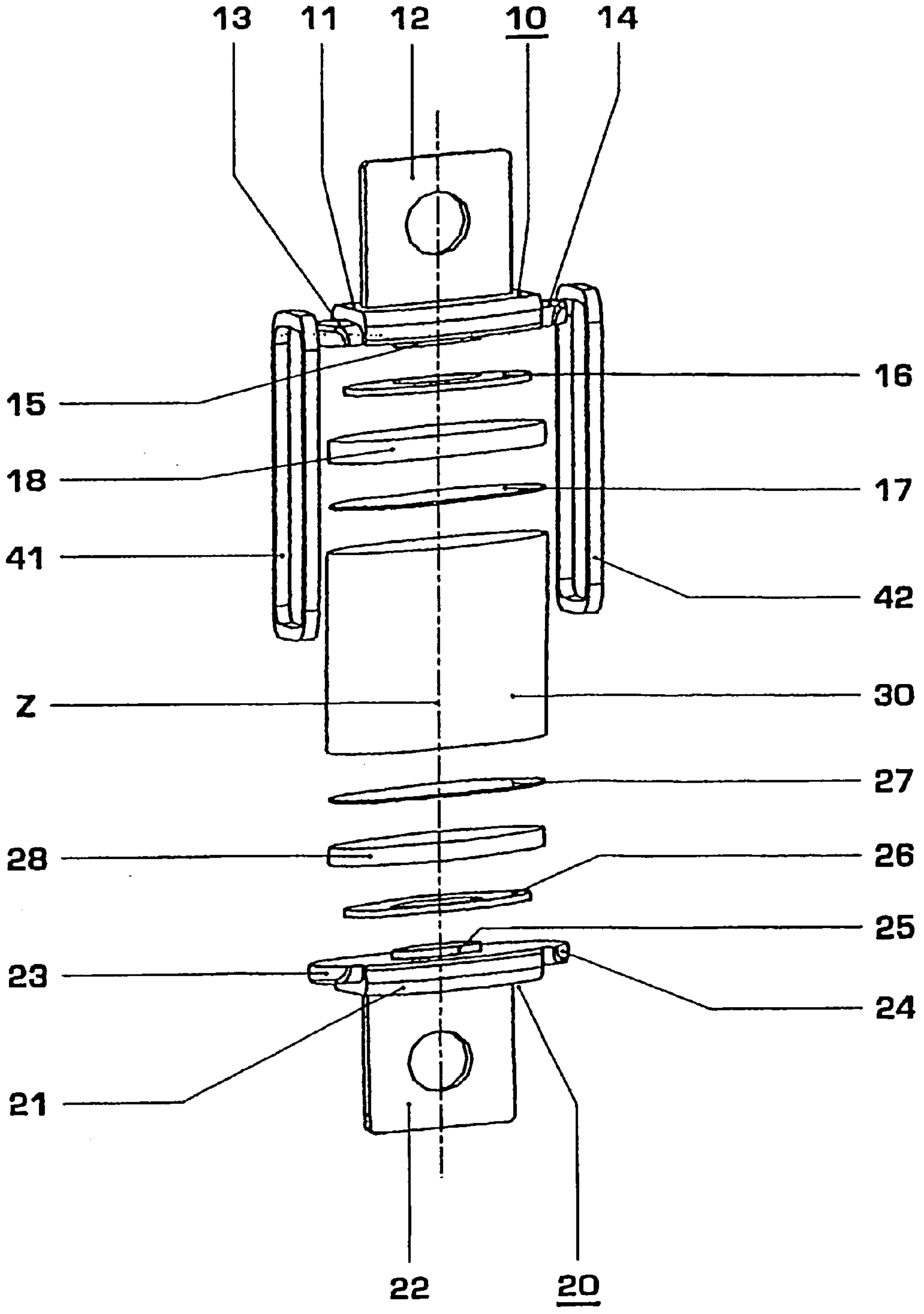
FIG. 1 shows an exploded illustration of a first embodiment of the active part according to the invention.
Figure 2:
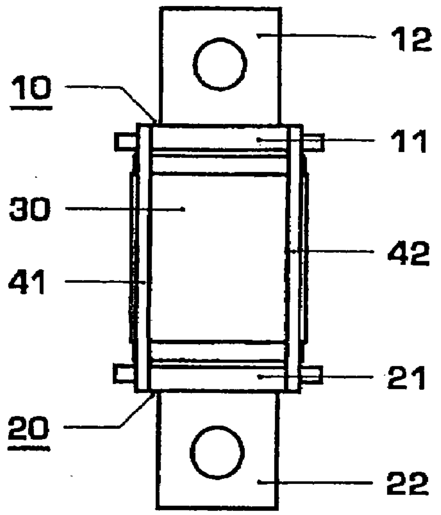
FIG. 2 shows a front view of the first embodiment of the active part.
Figure 3:
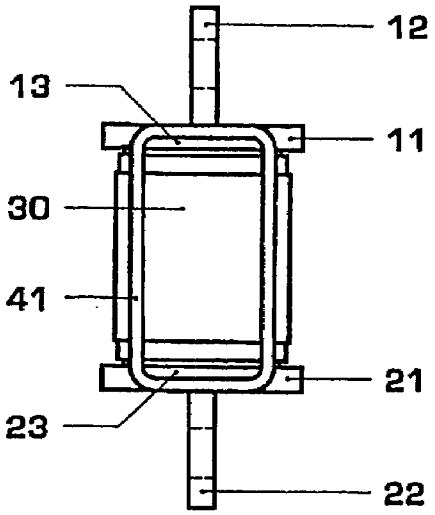
FIG. 3 shows a side view of the first embodiment of the active part.

The same reference symbols in all of the figures denote parts which also have the same effect. The active part which is illustrated in FIGS. 1 to 3 has two connecting fittings 10, 20 which are composed of electrically conductive material, such as aluminum, and are separated from one another along an axis z (FIG. 1). Each of the two connecting fittings 10 and 20 has an electrode which is arranged at right angles to the axis and is in the form of a plate 11 or 21, respectively, as well as a respective electrical connection 12 or 22, which is integrally formed on the respective plate 11 or 21. Shoulders 13, 14 and 23, 24 are formed in sections of the plate edge which run in a straight line on opposite faces of the plates. A tab 15 or 25, respectively, which is in the form of a circular disk, projects respectively from the lower face of the plate 11 or from the upper face of the plate 21. The tab 15 or 25, respectively, surrounds the axis z rotationally symmetrically and is used for centering and guidance of one or more cup springs 16 or 26, which are each in the form of conical annular disks and are composed of an electrically conductive material.

The respective tab 15 or 25, the respective cup spring 16 or 26 and a cylindrical varistor column 30 composed of non-linear resistance material, for example based on metal oxide, such as ZnO in particular, are arranged coaxially between the connecting fittings 10, 20. As can be seen, the varistor column 30 is formed from a single varistor element, but may also include two or more elements stacked one on top of the other. The upper or the lower end face of the varistor column 30, respectively, makes contact with a current contact element 17 or 27, respectively. An electrically conductive pressure absorbing plate 18 or 28, respectively, is provided between the respective cup spring 16 or 26 and the current contact element 17 or 27.

As can be seen from FIGS. 2 and 3, the active part is in the form of a column. The foot of the column is formed by the plate 21, and the head is formed by the plate 11. As is shown in FIG. 1, the cup spring 26, the pressure absorbing plate 18, the current contact element 27, the varistor column 30, the current contact element 17, the pressure absorbing plate 18 and the cup spring 16 are arranged in this sequence between them. The column is thus held together by means of two rectangular dielectric loops 41 and 42. The column is prestressed against the force of the cup springs 16, 26 during the manufacture of the active part. In the process, the cup springs are centered on the two tabs 15 and 25. The diameters of the centering tabs 15 and 25, respectively, and the internal diameters of the cup springs 16 and 26, respectively, which are in the form of annular disks, are matched to one another so as to prevent the cup springs from being pressed flat and thus to prevent the unacceptable overexpansion associated with this. When the column is prestressed, the dielectric loops 41 and 42, respectively, are pushed onto the respective shoulders 13, 23 and 14, 24, and the stress is then removed from the column. The spring movement of the cup springs is designed such that the force which is applied by them and is absorbed by the dielectric loops is sufficient to hold the column together as the active part. Since the active part temporarily has to carry current in certain operating conditions, the force is at the same time chosen to be sufficiently great in order to keep the contact resistances small in a current path which runs from the connecting fitting 10 via the varistor column 30 to the connecting fitting 20.

As can be seen from FIG. 3, the shoulders 13, 23 have a surface which is largely parallel to the plate surface over the majority of the plate extent, and the rectangular dielectric loop 41 is supported on the inside by two mutually opposite rectangular faces on these surfaces. This configuration of the shoulders and of the dielectric loop allow the dimensions of the connecting fittings 10, 20 to be kept small and to be reduced to the thicknesses of the plates 11 or 21. In addition to a small physical height of the active part, this also at the same time ensures its mechanical strength and its current-carrying capacity.

Figure 7:
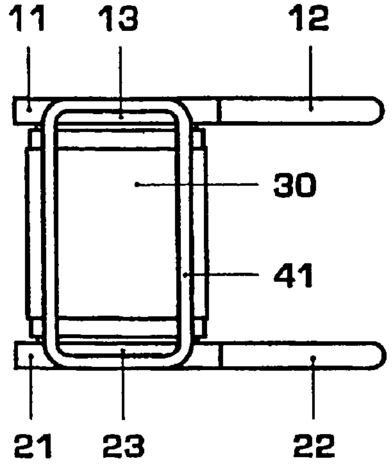

In order to reduce the use of materials and the manufacturing costs, the electrical connections 12, 22 are flat. In practice, they may be integrally formed at any desired angle on the plates 11, 22. If they are aligned in the direction of the axis z, are integrally formed centrally on the plates and are in the form of a perforated plate, as is illustrated in the exemplary embodiment shown in FIGS. 1 to 3, then even a heavy cable conductor to which a high voltage can be applied can be screwed to the connection 12, and a corresponding grounding conductor can be screwed to the connection 22 in a space-saving manner. Alternatively, as is illustrated in FIG. 7, the connections 12, 22 may be routed in the direction of the plates 11, 21 and, for example, may be in the form of plug-in connections.

Figure 4:
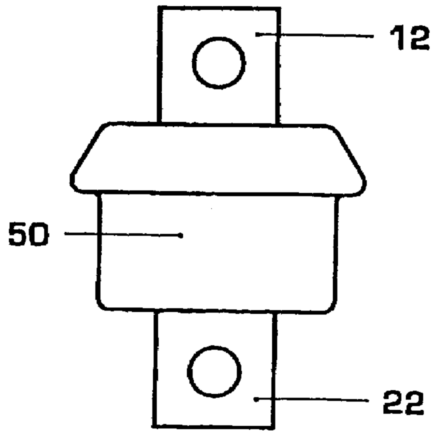
FIG. 4 shows an embodiment of a surge arrester which is intended for indoor applications and includes the active path as shown in FIGS. 1 to 3.
Figure 5:
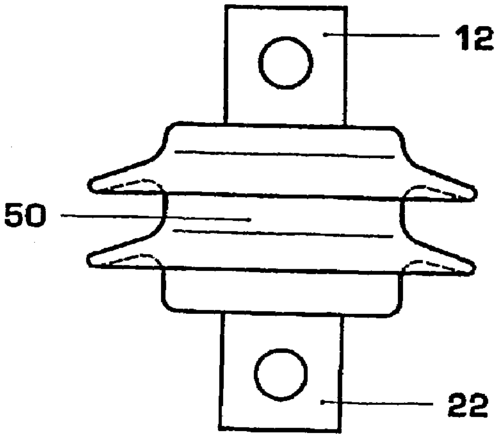
FIG. 5 shows an embodiment of a surge arrester which is intended for outdoor applications and includes the active part as shown in FIGS. 1 to 3.

As can be seen from FIGS. 4 and 5, the varistor column, the plates of the connecting fittings and the dielectric loops may be surrounded by insulating material, for example a polymer, for example based on silicone or epoxy. Depending on the design of the surrounding dielectric compound, this results in a surge arrester which is suitable for indoor applications (FIG. 4) or for outdoor applications (FIG. 5) and has electrical connections 12, 22 which are passed out of a dielectric housing 50.

Figure 6:
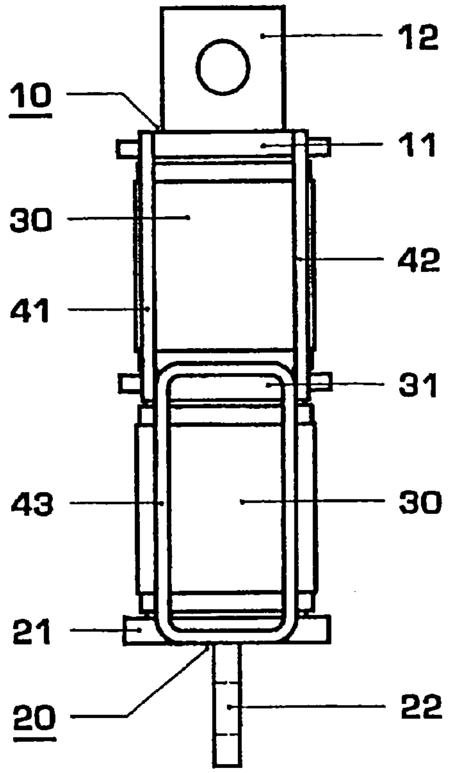
FIG. 6 shows a view of a second embodiment of the active part according to the invention, which is intended for a high dielectric load.

The dielectric loops need not necessarily be supported on both connecting fittings. As can be seen from the exemplary embodiment in. FIG. 6, a metallic connection piece 31 may be arranged in the varistor column in an active part which can be loaded at high voltages. The dielectric loops 41, 42 are then supported on the upper plate 11 of the connecting fitting 10 and on the connection piece 31, and produce the holding and contact force in an upper section of the active part. A dielectric loop 43 and a further dielectric loop, which cannot be seen, are supported on the connection piece 31 and on the plate 21 of the lower connecting fitting 20, and produce the holding and contact force in a lower section of the active part.

Figure 9:
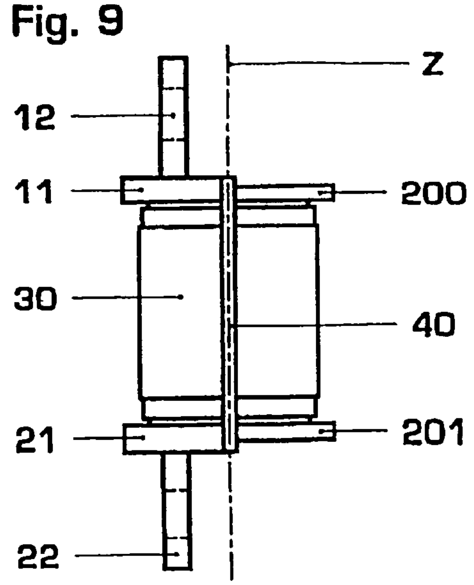
FIG. 9 shows a view of a fifth embodiment of the active part according to the invention.

In the embodiment of the active part as shown in FIG. 9, only two shoulders 200 and 201 are provided as the supporting means, and these are formed in the plates 11, 21 and passed through the axis z of the varistor column. This ensures that a dielectric loop 40, which is likewise in the form of a rectangle, is held centrally in the area of the axis z, and ensures a uniform holding and contact force in the active part. This ensures a uniform current density for a dissipation current which is carried in an active part when an overvoltage occurs.

Figure 8:
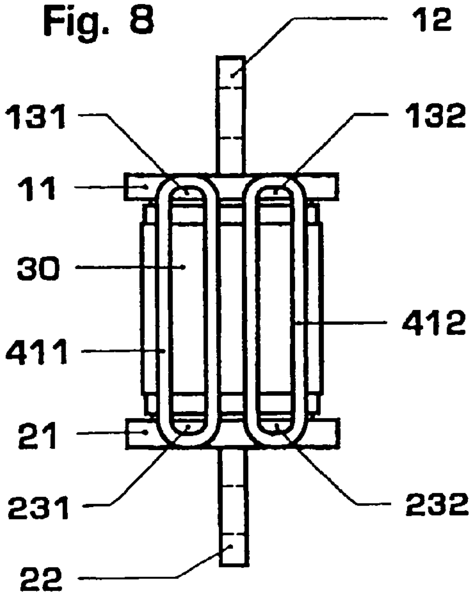
FIG. 8 shows a view of a fourth embodiment of the active part according to the invention.

As illustrated in FIG. 8, shoulders 131, 132, 231, 232 may be formed at the edges of the plates 11, 21 as supporting means, and these shoulders are narrower than the diameter of the varistor column. Without having to sacrifice the advantage of a small physical heat and the saving in materials, the holding and contact force in the active part can be achieved by means of a comparatively large number of narrow dielectric loops 411, 412.

LIST OF REFERENCE SYMBOLS

10, 20 Connecting fittings
11, 21 Plates
12, 22 Electrical connections
13, 14, 23, 24, 131, 132,
200, 201, 231, 232 Shoulders
15, 25 Centering tabs
16, 26 Cup springs
17, 27 Current contact elements
18, 28 Pressure absorbing plates
30 Varistor column
31 Connection piece
40, 41, 42, 43, 411, 412 Dielectric loops
50 Dielectric housing
z Axis

The invention claimed is:

1. An active part for a surge arrester having two connecting fittings which are arranged along an axis at a distance from one another, having at least one cylindrical varistor column, which is provided between the two connecting fittings, and having at least one dielectric loop, which is supported on the two connecting fittings or on one of the two connecting fittings and a connection piece, which is arranged between the two connecting fittings in the varistor column, and holds together the varistor column or a section of the varistor column, which is bounded by the supporting connecting fitting and the connection piece, thus forming a contact force, wherein at least one of the two connecting fittings has an electrode, which is arranged at right angles to the axis and is in the form of a plate, as well as a current terminal, which is in the form of a perforated plate or a plug-in contact and which is integrally formed on the plate electrode, and means for supporting one end of the dielectric loop, which means are formed in the plate electrode and/or are integrally formed at the edge of the plate electrode.

2. The active part as claimed in claim 1, wherein an axially symmetrical centering tab projects from a surface of the plate electrode facing the varistor column and is used to guide at least one cup spring which is in the form of a conical annular disk.

3. The active part as claimed in claim 2, wherein the diameter of the centering tab and the internal diameter of the annular disk are matched to one another so as to prevent the cup spring from being pressed flat.

4. The active part as claimed in claim 1, wherein the supporting means have at least one shoulder which is integrally formed at the edge of the plate electrode and is narrower than the diameter of the varistor column.

5. The active part as claimed in claim 1, wherein the supporting means have a shoulder which is formed in the plate electrode and passes through the axis of the varistor column.

6. The active part as claimed in claim 1, wherein the supporting means have two shoulders which are formed in the plate electrode and are each arranged in one of two sections of the plate edge which run in a straight line.

7. The active part as claimed in claim 5, wherein the shoulder has a surface which is largely parallel to the plate electrode surface over the majority of the plate electrode extent, and wherein the loop is in the form of a rectangle and is supported on the inside by means of one of the rectangular faces on the surface.

8. A surge arrester as claimed in claim 1 having a housing which is composed of insulating material and surrounds the varistor column, parts of the connecting fittings and the dielectric loop.

9. The surge arrester as claimed in claim 8, wherein electrical connections of the fittings are passed out of the housing.

* * * * *